July 25, 1967     NOBORU SAITO     3,333,222
HEATED TYPE VARIABLE RESISTOR
Filed Nov. 2, 1965     2 Sheets-Sheet 1
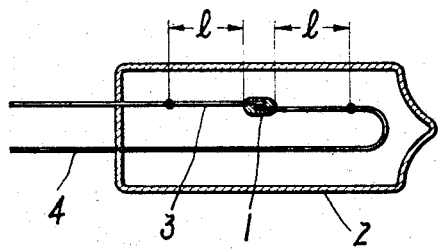
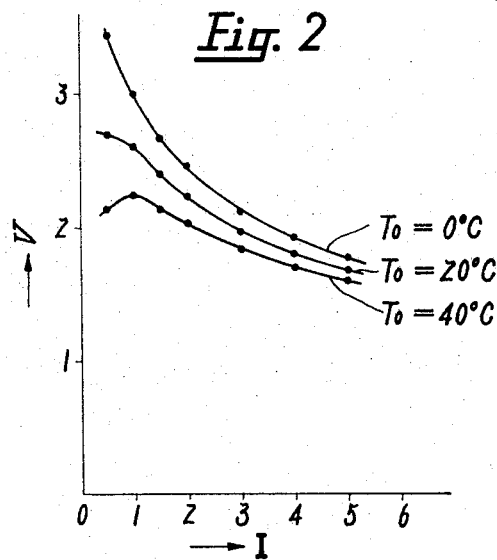
INVENTOR
Noboru Saito
BY Watson, Cole, Grindle + Watson
ATTORNEYS

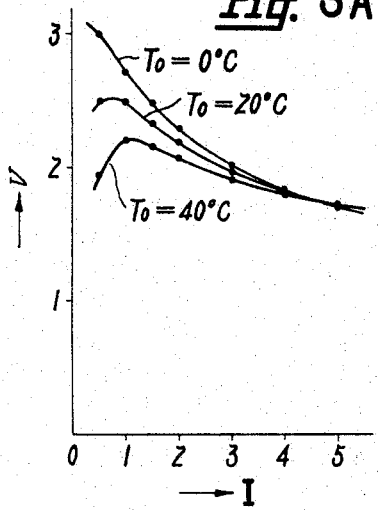
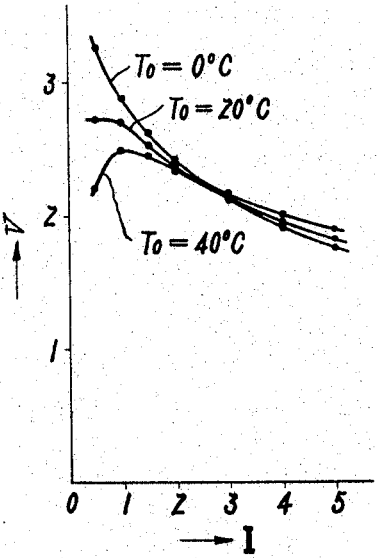
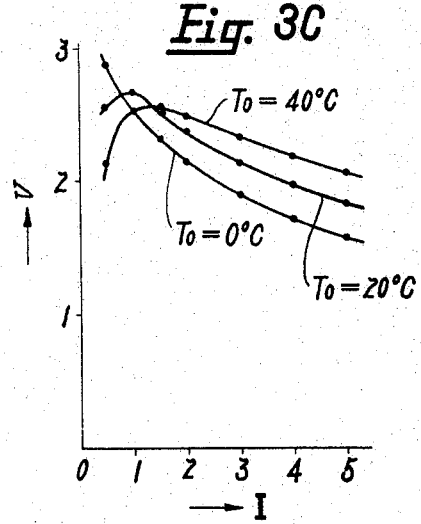

United States Patent Office 3,333,222
Patented July 25, 1967

3,333,222
HEATED TYPE VARIABLE RESISTOR
Noboru Saito, Tokyo, Japan, assignor to Toa Electronics Limited, Tokyo, Japan
Filed Nov. 2, 1965, Ser. No. 506,032
Claims priority, application Japan, Nov. 7, 1964, 39/62,723
5 Claims. (Cl. 338—22)

ABSTRACT OF THE DISCLOSURE

The subject matter hereof relates to a variable resistor of a type wherein a substance having a property of being absorbed on the inside wall of a vessel is sealed in said vessel enclosing a thermistor element so that said substance may be absorbed on or desorbed from the inside wall of the vessel with the fluctuation of the ambient temperature whereby the total heat dissipation coefficient of the resistor may be varied.

---

This invention relates to heated type variable resistors and more particularly to self-heated type variable resistors of a type in which a thermistor element is sealed in a vessel so that the vacuum degree in said vessel may vary with the fluctuation of the ambient temperature.

An object of the present invention is to provide a self-heated type variable resistor of stable characteristics wherein the voltage-current characteristics (V-I characteristics) of the above mentioned thermistor element is little influenced by the variation of the ambient temperature in the self-heated zone of the element.

In the accompanying drawings:

FIGURE 1 is a sectioned view showing the structure of a self-heated type variable resistor of a type in which a thermistor element is sealed in a vessel;

FIGURE 2 is a diagram of voltage-current characteristics of a conventional resistor of this kind of type;

FIGURES 3A, 3B and 3C are diagrams of voltage-current characteristics of resistors of the same type as in the above according to the present invention.

In FIGURE 1 is illustrated the structure of this kind of variable resistor wherein a thermistor element 1 made of vanadium glass is fixed to a platinum electrode wire 3 connected further to a lead wire 4 made of a Dumet wire and is sealed in a glass vessel from which the gas has been properly exhausted and $l$ is the length of the electrode wire 3.

If an electric current is made to flow to the above mentioned thermistor element 1 through the lead wire 4, the temperature of the element 1 will rise due to self-heating from the initial temperature (ambient temperature) $To$ to a temperature $Ta$ and will balance. The formula of the state of heat balance of the element 1 in such case is represented by $$W = Kl(Ta-To) + KgNo\sqrt{To}(Ta-To) + Kr(Ta^4-To^4) \quad (1)$$

Wherein $W$ is an electric power in mw. applied to the element 1,
$Kl$ is a thermal conductivity of the electrode wire (a constant determined by the material and dimensions of the electrode wire),
$Kg$ is a constant determined by the kind of the gas in the vessel and the dimensions of the element,
$Kr$ is a coefficient of heat radiation (a constant determined by the surface area of the element 1),
$No$ is a number of molecules of the gas in the vessel,
$Ta$ is a temperature in degrees K of the element 1 and
$To$ is an ambient temperature in degrees K.

Now, in a conventional resistor of this kind, it is general that some gas which will not be adsorbed on the wall of the vessel is enclosed in the vessel sealing the thermistor element or the thermistor element is sealed in the vessel made highly vacuum by exhausting even the gas adsorbed and occluded on the wall of the vessel. The such resistor as $Kl$ and $Kr$ in the above mentioned Formula 1 are constants determined by the structure, $Kg$ and $No$ therein are constants determined by the sealing vacuum degree and the kind of the enclosed gas and both are constant, in case a constant current is made to flow to the element 1, as shown in FIGURE 2, if the ambient temperature $To$ fluctuates, the terminal voltage will vary. That is to say, the conventional resistor of this kind has a defect that, in case it is used in an electronic circuit or the like, with the fluctuation of the ambient temperature, its V-I characteristics will vary and will become unstable.

The present invention is intended to reduce the above mentioned fluctuation of characteristics and its basic idea is to enclose in a vessel sealing a thermistor element a substance having a property of being adsorbed on the inside wall of the vessel so that, with the fluctuation of the ambient temperature, the molecules of the above mentioned substance may be adsorbed on or desorbed from the inside wall of the vessel, the number $No$ of the molecules of the gas in the vessel may be decreased or increased (that is to say, the vacuum degree in the vessel may be varied) and thus the total heat dissipation coefficient of the resistor may be varied.

This shall be explained with reference to the above mentioned Formula 1. When the thermistor element is at a fixed temperature $Ta$, if the ambient temperature $To$ rises, the first and third terms on the right side of the Formula 1 will decrease but the second term will increase as the substance adsorbed on the inside wall of the vessel will be desorbed from the vessel wall as gas molecules and $No$ will increase with the rise of $To$ and, after all, the sum of the respective terms on the right side of the Formula 1 will tend to become constant irrespective of the fluctuation of the ambient temperature $To$. If the amount of decrease of the first and third terms and the amount of increase of the second term are equal to each other, the Formula 1 will be constant and invariable irrespective of the fluctuation of $To$.

In case the ambient temperature $To$ reduces, reversely to the above, $Ta-To$ will become large and therefore the first and third terms will increase but the adsorptive gas molecules will be adsorbed on the vessel wall, $No$ will decrease, therefore the second term will decrease and the sum of the respective terms on the right side of the Formula 1 will tend to become constant as in the case of the rise of the ambient temperature $To$.

For the adsorptive substance to be enclosed in the vessel in the above description is proper such substance which is liquid at the normal temperature and has a proper surface tension as, for example, of $H_2O$ molecules.

In order to actually make a variable resistor the present invention on the basis of the above described idea, the gas in a vessel is first exhausted with an exhausting apparatus (in such case in order to drive out the gas molecules adsorbed and occluded on the vessel wall, the vessel is heated at a high temperature in the exhausting apparatus), and an adsorptive substance (for example, of $H_2O$ molecules in the state of a water vapor) is then introduced into the vessel so as to be adsorbed on the inside wall of the vessel. As soon as the adsorption ends, the vessel is again evacuated, the vacuum degree in the vessel is selected to be proper and the exhaust port is then closed. In order to introduce $H_2O$ molecules, in fact, air of a proper humidity may be introduced.

FIGURES 3A, 3B and 3C show characteristics of resistors made in such manner. In each of them, air of a humidity of 70% at a temperature of 20° C. was enclosed to be adsorbed. The air was enclosed at a vacuum degree of $3 \times 10^{-2}$ mm. Hg in FIGURE 3A, $4 \times 10^{-2}$ mm. Hg in FIGURE 3B and $5 \times 10^{-2}$ mm. Hg in FIGURE 3C. The proper value of the vacuum degree varies depending on the kind of the gas to be enclosed and adsorbed (or on the humidity and temperature at the time of enclosing air). Therefore, just some examples are shown here.

As understood from the above mentioned Formula 1, the characteristics in FIGURES 3A, 3B and 3C can be varied depending on the material, length and thickness or the thermal conductivity $Kl$ of the electrode wire, the radiation coefficient $Kr$ related with the size of the element, the number of molecules of the free gas (related with the vacuum degree and volume) in the vessel and the amount of adsorption of the gas (related with the kind and inside wall area of the vessel and the kind of the enclosed gas).

For example, in the resistors of the characteristics shown in FIGURES 3A, 3B and 3C, as described above, $H_2O$ molecules were adsorbed and the vacuum degree was selected to be as described above under the following conditions:

Material and size of the element:
  Vanadium glass
    0.7 to 0.8 mm. in long diameter and 0.3 to 0.4 mm. in short diameter.
Material and size of the vessel:
  Flint glass
    7 mm. in outside diameter, 5.5 mm. in inside diameter and 30 mm. long.
Material and dimensions of the electrode wire:
  Platinum
    10 mm. long and 0.05 mm. thick.
Resistance value (at 25° C.): 10 KΩ.
B constant: 2800° K.

As understood from FIGURES 3A, 3B and 3C, according to the present invention, though it is actually difficult to uniformly stabilize the V-I characteristics of the resistor for a wide range of heating currents with the fluctuation of the ambient temperature, a heating current zone which will not be substantially influenced by the ambient temperature can be easily realized in a part of the V-I characteristics as shown in FIGURES 3A and 3B. Therefore, if the self-heating current of the resistor of the present invention is selected to be within a range in which the terminal voltage of the resistor will not substantially vary with the fluctuation of the ambient temperature, the resistor will be able to be operated as a stable resistance.

What is claimed is:
1. A resistor comprising a sealed vessel, a thermistor element freely suspended in said vessel, a gaseous substance in said vessel, the inner wall of said vessel being capable of absorbing said gaseous substance, the proportional amount of said gaseous substance absorbed on the inner wall of said vessel being determined by the ambient temperature, whereby the voltage-current characteristic of said thermistor remains substantially constant with change in ambient temperature.

2. A resistor as claimed in claim 1 wherein said gaseous substance includes $H_2O$ molecules.

3. A resistor as claimed in claim 1 wherein an electrode wire is connected to said thermistor element and said voltage-current characteristic remains substantially constant with change in ambient temperature in accordance with the formula $$W = Kl(Ta-To) + KgNo\sqrt{To}(Ta-To) + Kr(Ta^4-To^4)$$

Wherein
  $W$ is the electric power applied to the thermistor element,
  $Kl$ is the thermal conductivity of the electrode wire,
  $Kg$ is a constant determined by the particular gaseous material used and the dimensions of the thermistor element,
  $Kr$ is a coefficient of heat radiation constant determined by the surface area of the thermistor element,
  $No$ is the number of molecules of the gaseous material in the vessel,
  $Ta$ is the temperature in degrees K of the thermistor element, and
  $To$ is the ambient temperature in degrees K.

4. A resistor as claimed in claim 3 wherein said thermistor element comprises vanadium glass and said electrode wire comprises platinum.

5. A method of producing a resistor as claimed in claim 1 comprising the steps of exhausting the gas in said vessel by vacuum means, heating the vessel to a predetermined temperature, introducing said gaseous substance into the vessel, evacuating said vessel to a predetermined vacuum degree and sealing said vessel, said predetermined temperature and vacuum degree being determined by the particular voltage-current characteristic desired.

References Cited
UNITED STATES PATENTS

| | | | |
|---|---|---|---|
| 2,389,915 | 11/1945 | Kleimack et al. | 338—22 |
| 2,414,792 | 1/1947 | Becker | 338—22 |
| 2,421,759 | 6/1947 | Pearson | 338—22 |
| 2,462,162 | 2/1949 | Christensen et al. | 338—22 |
| 2,700,720 | 1/1955 | Torok | 338—22 |
| 2,871,377 | 1/1959 | Tyler et al. | 307—88.5 |
| 2,928,037 | 3/1960 | Lawrence | 338—22 |

RICHARD M. WOOD, *Primary Examiner.*

W. D. BROOKS, *Assistant Examiner.*